United States Patent
Baker

(10) Patent No.: US 11,676,026 B2
(45) Date of Patent: Jun. 13, 2023

(54) USING BACK PROPAGATION COMPUTATION AS DATA

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 305 days.

(21) Appl. No.: 16/619,325

(22) PCT Filed: Jun. 4, 2019

(86) PCT No.: PCT/US2019/035300
§ 371 (c)(1),
(2) Date: Dec. 4, 2019

(87) PCT Pub. No.: WO2020/005471
PCT Pub. Date: Jan. 2, 2020

(65) Prior Publication Data
US 2020/0394521 A1    Dec. 17, 2020

Related U.S. Application Data

(60) Provisional application No. 62/691,907, filed on Jun. 29, 2018.

(51) Int. Cl.
*G06N 3/084*        (2023.01)
*G06N 3/045*        (2023.01)
(Continued)

(52) U.S. Cl.
CPC ............ *G06N 3/084* (2013.01); *G06F 18/214* (2023.01); *G06N 3/045* (2023.01); *G06T 1/20* (2013.01)

(58) Field of Classification Search
None
See application file for complete search history.

(56) References Cited

U.S. PATENT DOCUMENTS

2014/0067735 A1    3/2014  Yu et al.
2014/0257803 A1*   9/2014  Yu .......................... G10L 15/16
                                                             704/232
(Continued)

FOREIGN PATENT DOCUMENTS

WO    WO 2018/063840 A1    4/2018
WO    WO 2018/175098 A1    9/2018
(Continued)

OTHER PUBLICATIONS

Ng, A, "CS294A Course Notes—Sparse Autoencoder," downloaded from <https://web.stanford.edu/class/cs294a/sparseAutoencoder_2011new.pdf> and verified online at least as of Feb. 19, 2015 via <https://web.archive.org/web/20150219073254/https://web.stanford.edu/class/cs>, 19 pp. (Year: 2011).*
(Continued)

*Primary Examiner* — Brian M Smith
(74) *Attorney, Agent, or Firm* — K&L Gates LLP

(57) ABSTRACT

Computer-implemented, machine-learning systems and methods relate to a neural network having at least two subnetworks, i.e., a first subnetwork and a second subnetwork. The systems and methods estimate the partial derivative(s) of an objective with respect to (i) an output activation of a node in first subnetwork, (ii) the input to the node, and/or (iii) the connection weights to the node. The estimated partial derivative(s) are stored in a data store and provided as input to the second subnetwork. Because the estimated partial derivative(s) are persisted in a data store, the second subnetwork has access to them even after the second subnetwork has gone through subsequent training iterations. Using this information, subnetwork 160 can compute classifications and regression functions that can help, for example, in the training of the first subnetwork.

20 Claims, 7 Drawing Sheets

(51) Int. Cl.
    *G06T 1/20*     (2006.01)
    *G06F 18/214*     (2023.01)

(56) References Cited

U.S. PATENT DOCUMENTS

| | | |
|---|---|---|
| 2015/0238148 A1 | 8/2015 | Georgescu et al. |
| 2016/0078339 A1 | 3/2016 | Li et al. |
| 2017/0372201 A1* | 12/2017 | Gupta ................ G06N 3/084 |
| 2018/0307969 A1* | 10/2018 | Shibahara ............ G06N 3/08 |
| 2018/0349189 A1* | 12/2018 | Rossi ................. G06N 3/02 |
| 2019/0095798 A1 | 3/2019 | Baker |

FOREIGN PATENT DOCUMENTS

| | | |
|---|---|---|
| WO | WO 2018/194960 A1 | 10/2018 |
| WO | WO 2018/226492 A1 | 12/2018 |
| WO | WO 2018/226527 A1 | 12/2018 |
| WO | WO 2018/231708 A2 | 12/2018 |
| WO | WO 2019/005507 A1 | 1/2019 |
| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

Ba, L. J. et al., "Do Deep Nets Really Need to be Deep," downloaded from <https://arxiv.org/abs/1312.6184v5>, 6 pp. (Year: 2014).*
Dean, J. et al., "Large scale distributed deep networks," Proc. of Neural Information Processing Systems (2012) 11 pp. (Year: 2012).*
International Search Report and Written Opinion of the International Searching Authority for International Application No. PCT/US2019/035300 dated Aug. 26, 2019.
Gupta, Tushar, "Deep Learning: Back Propagation", Towards Data Science, Jan. 25, 2017, https://towardsdatascience.com/back-propagation-414ec0043d7>, 8 pages.

* cited by examiner

USING BACK PROPAGATION COMPUTATION AS DATA

PRIORITY CLAIM

The present application is a national stage application under 35 U.S.C. § 371 of PCT application Serial No. PCT/US19/35300, filed Jun. 4, 2019, which claims priority to U.S. provisional application Ser. No. 62/691,907, filed Jun. 29, 2018, both having the same title and inventor as identified above.

BACKGROUND

A conventional neural network, such as shown in FIG. 3, comprises an input layer, an output layer, and one or more hidden layers there between. "Deep" neural network have multiple hidden layers between the input and output layers. Each layer comprises one or more nodes, and each node is connected to one or more nodes in another layer. In FIG. 3, the circles represent nodes and the arrows represent the connections, sometimes called "arcs," between nodes. Each node receives input, changes its internal state (or "activation") according to an activation function, and produces an output that depends on the input and the activation. The network forms by connecting the output of certain nodes to the input of other nodes, thereby forming a directed, weighted graph. Many machine learning systems, such as multi-layer neural networks, are trained by gradient descent or stochastic gradient descent wherein an estimate of the gradient of an objective function for each training example is computed by an application of the chain rule of calculus known as back propagation. For a training example, the back propagation computes the partial derivative of the objective with respect to each learned parameter, also called a "trainable parameter."

SUMMARY

In some machine learning models, the back propagation computation also computes other partial derivatives. For example, in a neural network, the back propagation also computes the partial derivative of the objective with respect to the activation value of each hidden layer node. The values of these partial derivatives are potentially useful for various purposes, such as for self-diagnosis, for a machine learning coach to guide the training process, or to help a self-organizing network make decisions about changes in the network architecture. The invention described herein, in various embodiments, enables these examples and many other uses of the information computed during the back propagation computation.

FIGURES

Various embodiments of the present invention are described herein by way of example in connection with the following figures, wherein.

DETAILED DESCRIPTION

Figure 3A:
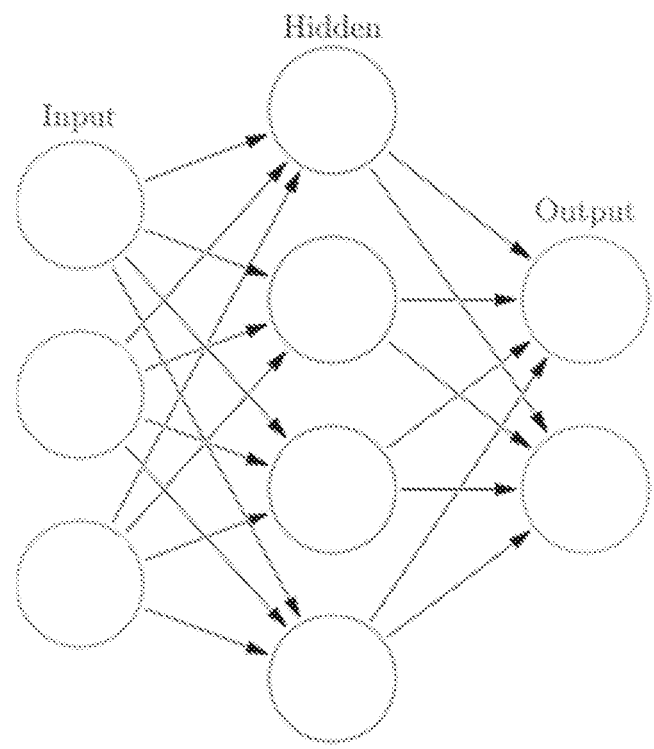
FIG. 3A is a diagram of a simple neural network and FIG. 3B is a diagram of an example feedforward neural network.
Figure 3B:
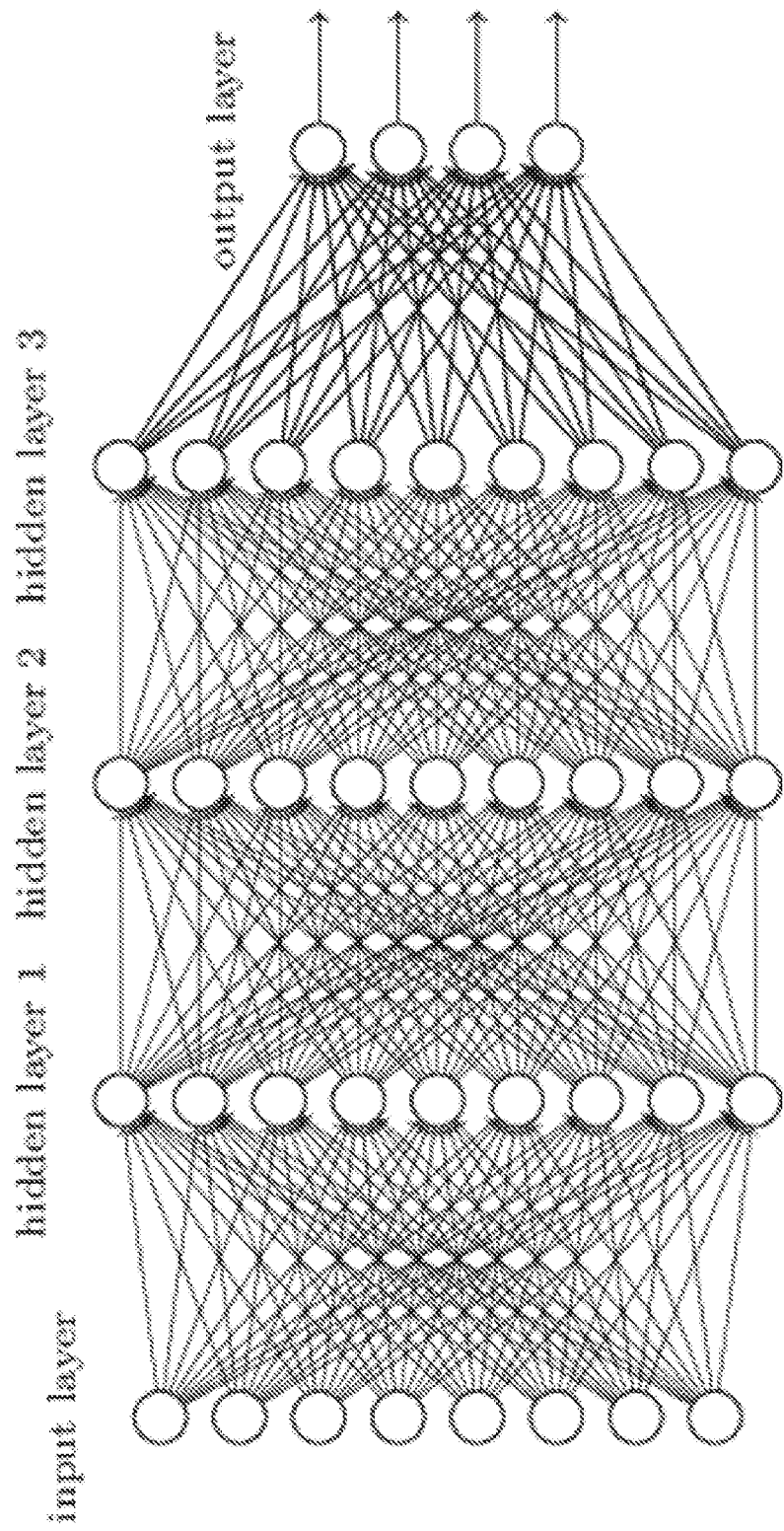

FIG. 3B is a diagram of an exemplary neural network, in this case a feedforward deep neural network that comprises a network of nodes organized into layers, in particular a layer of input nodes, two or more inner layers of nodes, and a layer of output nodes. There is an input node associated with each input variable and an output node associated with each output variable. An inner layer may also be called a hidden layer. A given node in the output layer or in an inner layer is connected to one or more nodes in lower layers by means of a directed arc from the node in the lower layer to the given higher layer node (shown as arrows between nodes in FIG. 3B). A directed arc may be associated with a trainable parameter, called its weight, which represents the strength of the connection from the lower node to the given higher node.

Each node in the output layer or in an inner layer is also associated with a function, called its activation function. The activation function of a node computes a value based on the values received from lower level connected nodes and the associated connection weights. For example, the activation value of a node for a data item might be determined by a formula such as:

$$A(x_1, x_2, \ldots, x_k, w_1, w_2, \ldots, w_k) = f(\Sigma_{i=1}^{k} w_i x_i + b)$$

where the values $x_i$ are the activation values of the connected lower level nodes, and the values $w_i$ are the respective connection weights, and b is an additional learned parameter associated with the node, called its bias, i.e., a constant independent of the current data item. In this example, the function $A=f(x)$ is called the activation function.

An example of an activation function $A=f(x)$ is the sigmoid function, defined by $A=1/(1+\exp(-x))$. Another example is the function defined by $A=\max(0, x)$. A node with this activation function is referred to as a rectified linear unit (ReLU). A third example is a piecewise linear function defined by $A=f(x)=\min(1, \max(0, x))$. This activation function is sometimes called a "hard sigmoid." A fourth example is the step function defined by $A=f(x)=0$ if $x \leq 0$, 1 if $x > 0$. This step function is also called the Perceptron function, after the name of the original simplified artificial model of a neuron.

For any given data item, the activation of each input node is equal to the value for the given data item of the input variable that corresponds to the node.

The activation value of each of the other nodes in the network for the given item is computed by a process called feed forward activation, which proceeds layer-by-layer through the network, computing the input to each node based on the activations of lower level nodes and their connection weights, and computes the output of the node by applying the node's activation function to the computed input.

A neural network learns to approximate the desired set of output values for each specified set of input values. The neural network is trained by an iterative procedure for updating the learned parameters, that is, the connection weights and biases. The learned parameters may be updated by a process called stochastic gradient descent. In stochastic gradient descent, an estimate is made of the gradient of the objective based on a set of training data examples, called a minibatch. The objective function is some measure of the accuracy of the output computed by the neural network, that is, some measure of how close the computed outputs for each data item are to the desired outputs for that data item. Typically, there is only one update of the learned parameters for each minibatch.

However, the objective function is measured for each individual data item, and the partial derivatives of the objective for each data item are computed by a process called back propagation. Back propagation proceeds backwards through the network, applying the chain rule of calculus to compute the partial derivatives. For each given node, the partial derivative of the objective with respect to the output activation value of the node is a weighted sum of the partial derivatives of the objective with respect to higher level nodes to which the given node is connected. The derivative for each higher level node passed to the computation for the lower level node is evaluated with respect to the input to the higher level node.

Figure 1:
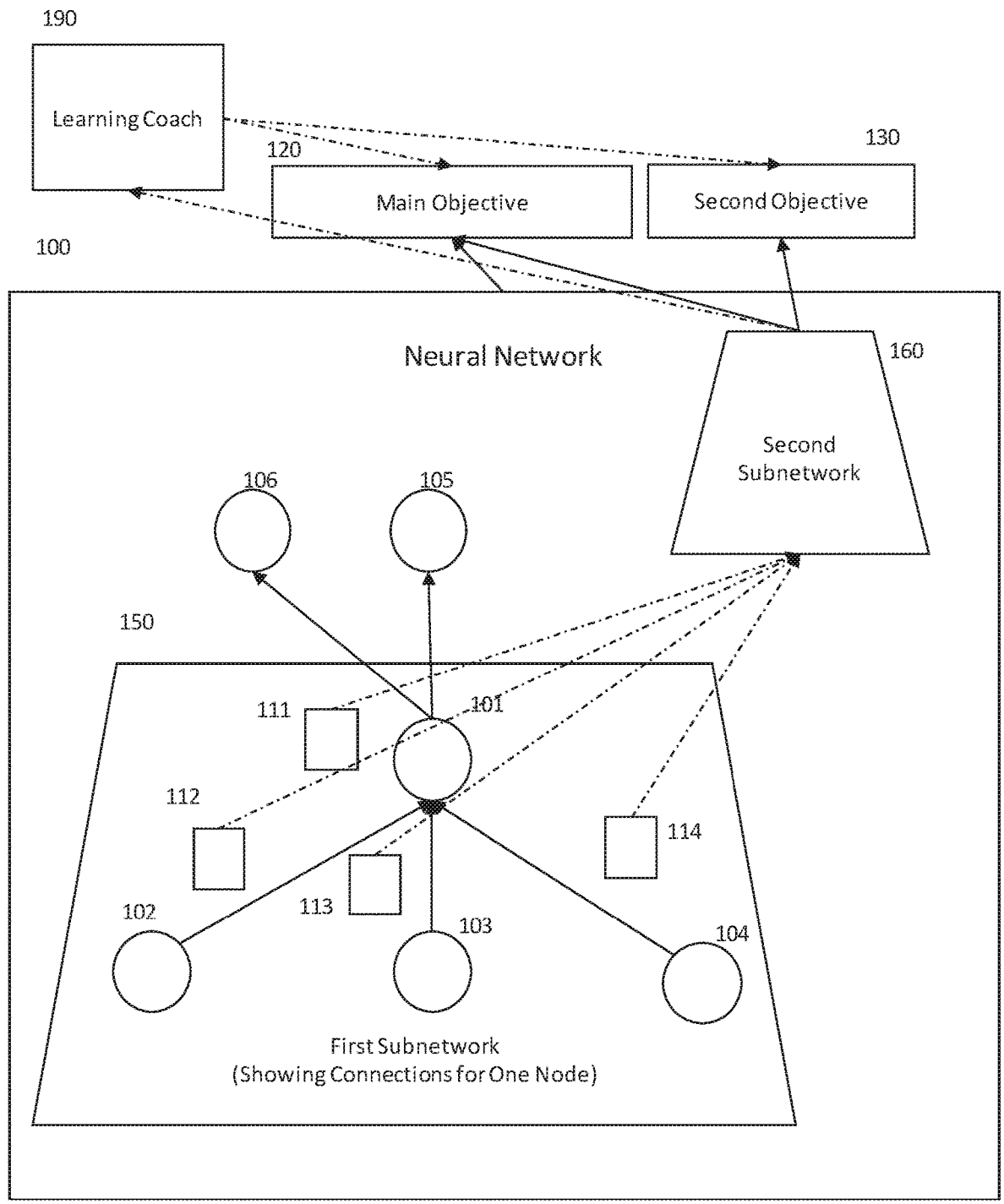
FIG. 1 is a block diagram of an illustrative embodiment of the invention described herein.

FIG. 1 is a flow chart depicting a method of improving a first deep neural network (e.g., a deep feedforward neural network such as shown in FIG. 3B) based on computations by a second deep neural network that uses a different objective than the first deep neural network and that uses as input one or more values computed in the back-propagation computation for the first deep neural network that are computed using the first deep neural network's objective. The first and second networks may be, for example, subnetworks 150, 160 of a main neural network 100 according to various embodiments. FIG. 1 focuses on a node 101 in a hidden layer of subnetwork 150 of the main neural network 100. Nodes 102, 103, and 104 represent nodes in a lower layer of neural network 100 that are connected to node 101 with trainable connection weights. Preferably, neural network 100 is trained by stochastic gradient descent based on minibatches or gradient descent based on the full batch of training data. Preferably, the computation used for estimating the partial derivatives in the gradient is a computation called back propagation, which is an implementation of the chain rule of calculus and is well-known to those skilled in the art of training neural networks. The gradient is a vector of partial derivatives of an objective function 120 or 130 with respect to each of the trained parameters. Typically, the trained parameters comprise connection weights, such as those connecting nodes 102, 103, and 104 with node 101, and a bias for each node, such as node 101. The back propagation computation computes an estimate for the partial derivative of an objective function for each example of training data for each trainable parameter.

Each node in a neural network is associated with a function, called its activation function, which is a simplified model for the activation of a neuron in a biological nervous system. The activation function specifies the output or activation of the node for each possible input. Generally, the input to a given node is a weighted sum of the outputs or activation values of the nodes connected to the given node each multiplied by its associated connection weight. With reference to the flow chart of FIG. 5, preferably, for each training data example 50, the computation has two phases, a feedforward computation and a back propagation computation. In the feedforward computation for the subnetwork 150, shown at step 52 in FIG. 5, for target node 101, the weighted sum of values it receives from 102, 103, and 104 respectively is computed, which sum is added to a bias term. Then, the output activation function for target node 101 is computed, which node 101 then feeds forward to nodes higher in the subnetwork 150, represented by nodes 105 and 106. The feedforward computations can be performed for the other nodes in the subnetwork 150, including nodes 105 and 106.

Figure 5:
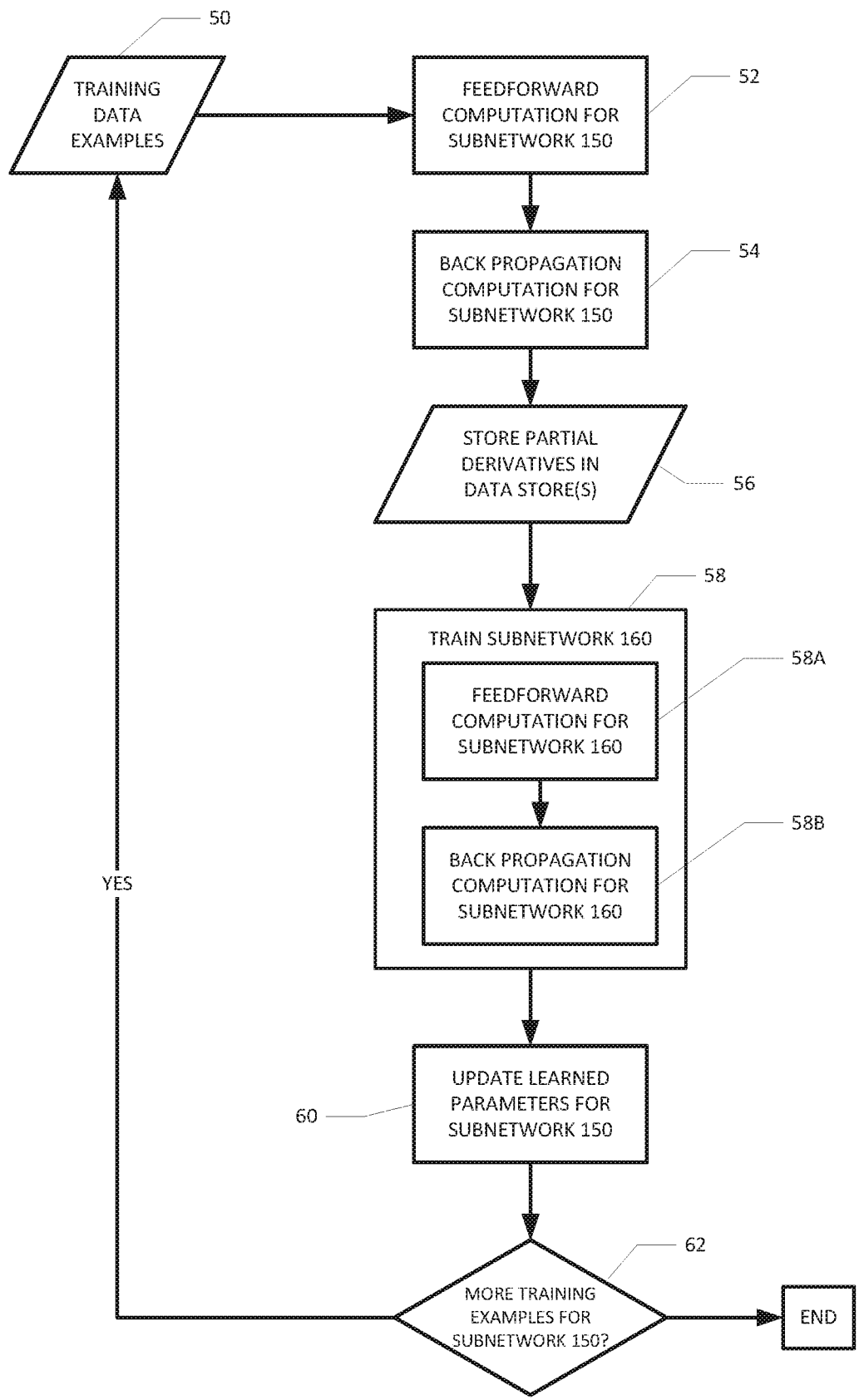
FIGS. 5 and 6 are flow chart illustrating processes performed by the computer system of FIG. 4 according to various embodiments of the present invention.

The second phase is the backpropagation computation, shown at step 54 of FIG. 5, which begins with an objective function 120. For example, in supervised training of a classification task, each training data example has a designated target classification. The objective function may be a loss function, which is a measure of the cost or loss associated with any deviation of the output of the network from the designated target classification. For example, the objective may be the cross-entropy between the output of the network and the vector that is zero in every position except the designated target for which the value is one. In the back propagation computation, the estimated partial derivatives of the objective with respect to the elements of the network begins with the derivatives of the objective with respect to the output values of the network, that is, the activation values of the output layer of the network. The estimated partial derivatives are propagated backwards through the network according to the chain rule of calculus, until the estimated partial derivatives are propagated back from nodes 105 and 106 through their connections to target node 101. In addition to the partial derivative of the objective defined by the cross entropy or other loss function determined at the output of the network, there may be additional terms in the objective applied at other points in the network through a process called regularization, which is a process well known to those skilled in the art of statistical estimation with regularization.

Still as part of the back propagation process, the estimated partial derivative of the objective 120 with respect to the output activation of node 101 is computed. Next, the estimated partial derivative of the objective with respect to the value that was input to node 101 during the feed forward computation is computed. The back propagation computation continues by computing the estimated partial derivatives of the objective with respect to the bias to node 101 and to the weights associated with the connections from nodes 102, 103, and 104, respectively. If the bias for node 101 is an additive term to the weighted sum of its other inputs, then the partial derivative of the objective with respect to the input to node 101 is the same as the partial derivative of the objective with respect to the bias for node 101.

Some neural network models have specialized structures that differ in the details, but generally they all share the property that the back propagation computation computes an estimate of the partial derivative of an objective with respect to each node, such as node 101, as part of the process of computing estimated partial derivatives of an objective with respect to the trainable parameters.

The illustrative embodiment illustrated in FIG. 1 does not depend on the details of the back propagation computation. In fact, it does not require that back propagation be the form of computation of the estimates of the partial derivatives. This illustrative embodiment merely requires that, by some method, an estimate of the partial derivative of an objective with respect to either the output activation of node 101 and/or the input to node 101 has been obtained. Optionally, estimated partial derivatives of an objective with respect to the connection weights associated with the connections to node 101 from nodes 102, 103, and 104, respectively, have also been obtained. For example, all of these partial derivatives are estimated for each node and each connection weight by the well-known back propagation computation.

After the partial derivatives have been estimated, the estimated partial derivative with respect to the output of and/or the input to node 101 is saved in data store 111 at step 56, and the estimated partial derivatives with respect to the weights associated with the connections from nodes 102, 103, and 104 are saved in data stores 112, 113, and 114, respectively. The values stored in data stores 111, 112, 113, and 114 are then provided as input to a second subnetwork 160 for training the second subnetwork 160, at step 58. The data stores 111-114 may be implemented with, for example, primary and/or secondary computer memory (computer memory that is directly (primary) or not directly (secondary) accessible by the processor(s) cores) of the system, as described further below.

In the embodiment illustrated by FIG. 1, the training for subnetwork 160 is different from the two-phase training computation for subnetwork 150 (which comprises a feed-forward activation computation (step 52) followed by a back propagation computation (step 54)). With reference to FIG. 1, to train the subnetwork 160 at step 58, the subnetwork 160 receives input from the data store 111 and, optionally, from data stores 112, 113, and 114. The data from these data stores is not available until the back propagation computation for subnetwork 150 at step 54 has proceeded backwards at least to target node 101 (including its incoming weights). In a preferred embodiment, the subnetworks 150 and 160 are disjoint with no connections from subnetwork 160 to subnetwork 150. In this embodiment, the feed forward computation for subnetwork 160 at step 58A is delayed until after the back propagation for subnetwork 150 at step 54 has been completed. Connections from subnetwork 150 to subnetwork 160 are allowed, since the activations for all of subnetwork 150 are computed at step 54 before the feed forward computation for subnetwork 160 at step 58A.

In other embodiments, an iterative process is used in which there is an alternation between a feedforward computation on all of network 100 followed by a back propagation computation on all of network 100, with the alternation repeating until a convergence criterion is met (e.g. the applicable error function is not reaching a threshold minimum). Generally, an embodiment with disjoint subnetworks 150 and 160 is preferred.

The back propagation computation for subnetwork 160 at step 58B begins with a second objective 130 and optionally also includes the main objective 120. The back propagation computation for subnetwork 160 then proceeds according to the well-known back propagation algorithm, applied to subnetwork 160. However, if there are connections from nodes in subnetwork 150 that are connected to nodes in subnetwork 160, in some embodiments, the new estimated partial derivatives back propagated from subnetwork 160 to subnetwork 150 are computed and added to the partial derivatives estimated in the back propagation computation of subnetwork 150 and are used in updating the learned parameters for the subnetwork 150 at step 60. However, new partial derivatives combining the objectives of subnetworks 150 and 160 need not, and preferable are not, stored in data stores such as 111, 112, 113, and 114. Thus, the back propagation from subnetwork 160 does not change the values input to subnetwork 160.

Steps 52-60 can be repeated for a number of training examples for the subnetwork 150, as indicated by the feedback loop from the decision block 62 to the training data examples 50. Trained in such a manner, the subnetwork 160 has information that is not available to a conventional feed forward or recursive neural network. Using this information, subnetwork 160 can compute classifications and regression functions that cannot be computed by any conventional feed forward network, no matter how complex. As an illustrative example, subnetwork 160 has input comprising the output activation value of the target node 101 as well as the partial derivative of the main objective 120 both with respect to the output activation of node 101 and with respect to the input to node 101. If the partial derivative of objective 120 has a large magnitude with respect to the output activation value of node 101, it means that changes in the activation of node 101 would have a large effect on the classification by network 100 and on the value of objective 120. This computation can be performed separately on each training data example, as shown in FIG. 5. In various embodiments, the results of these computations may be accumulated over each minibatch used for training the subnetwork 150 and may even be accumulated over larger sets, herein called macrobatches, or the full batch comprising all the training data for training the subnetwork 150.

For each data example and for any of the batches, the subnetwork 160 also has the value of the estimated partial derivative of the main objective 120 with respect to the input to node 101. Even on a data example for which the magnitude of the partial derivative of the main objective 120 with respect to the output activation of node 101 is very large, the magnitude of the estimated partial derivative of the main objective 120 with respect to the input to node 101 may be very small. This situation may occur whenever the input to node 101 is at a point in the activation function with a derivative that is close to zero. The magnitude of the derivative of the main objective 120 with respect to the output of node 101 only depends on the partial derivatives of nodes higher in the network than node 101, such as nodes 105 and 106, and on the weights by which node 101 is connected to them. This magnitude does not depend on either the activation value of node 101 or on the value of the derivative of the activation function of node 101 at that activation value.

It is quite likely that the low magnitude partial derivative of the objective 120 with respect to the input to node 101 on this one data example will be swamped by larger magnitude partial derivatives for other data items, so node 101 might not be trained in the direction desirable for this data example.

Subnetwork 160 has the necessary information to detect this problem in the learning process for the subnetwork 150 and to activate an output node that sends a signal of the problem and that even identifies node 101 in the subnetwork 150 as the affected node. This signal can trigger corrective action for the subnetwork 150. For example, in an illustrative embodiment, shown in FIG. 6, a learning coach 190, at step 61, monitors the output of subnetwork 160 and may choose, at step 80, to intervene in the learning process for the subnetwork 150, for example by, at step 82, setting a customized value of a hyperparameter for the subnetwork 150, such as learning rate or temperature, customized for node 101, as well as giving extra weight to a training example. Learning coach 190 may intervene in the learning process in other ways, such as changing the architecture of the network (e.g., adding a node to a selected layer and/or adding a new layer) or doing data selective training. In some embodiments, other means of fixing or reducing the problem may be used.

A learning coach, such as learning coach 190, is a separate machine learning system that learns to control and guide the development and training of a primary learning system, such as the neural network 100 and/or the subnetwork 150. Learning coaches are explained in the following published international applications, which are incorporated herein in their entirety: WO 2018/063840 A1, entitled "LEARNING COACH FOR MACHINE LEARNING SYSTEM"; and WO 2018/175098 A1, entitled "LEARNING COACH FOR MACHINE LEARNING SYSTEM."

Figure 6:
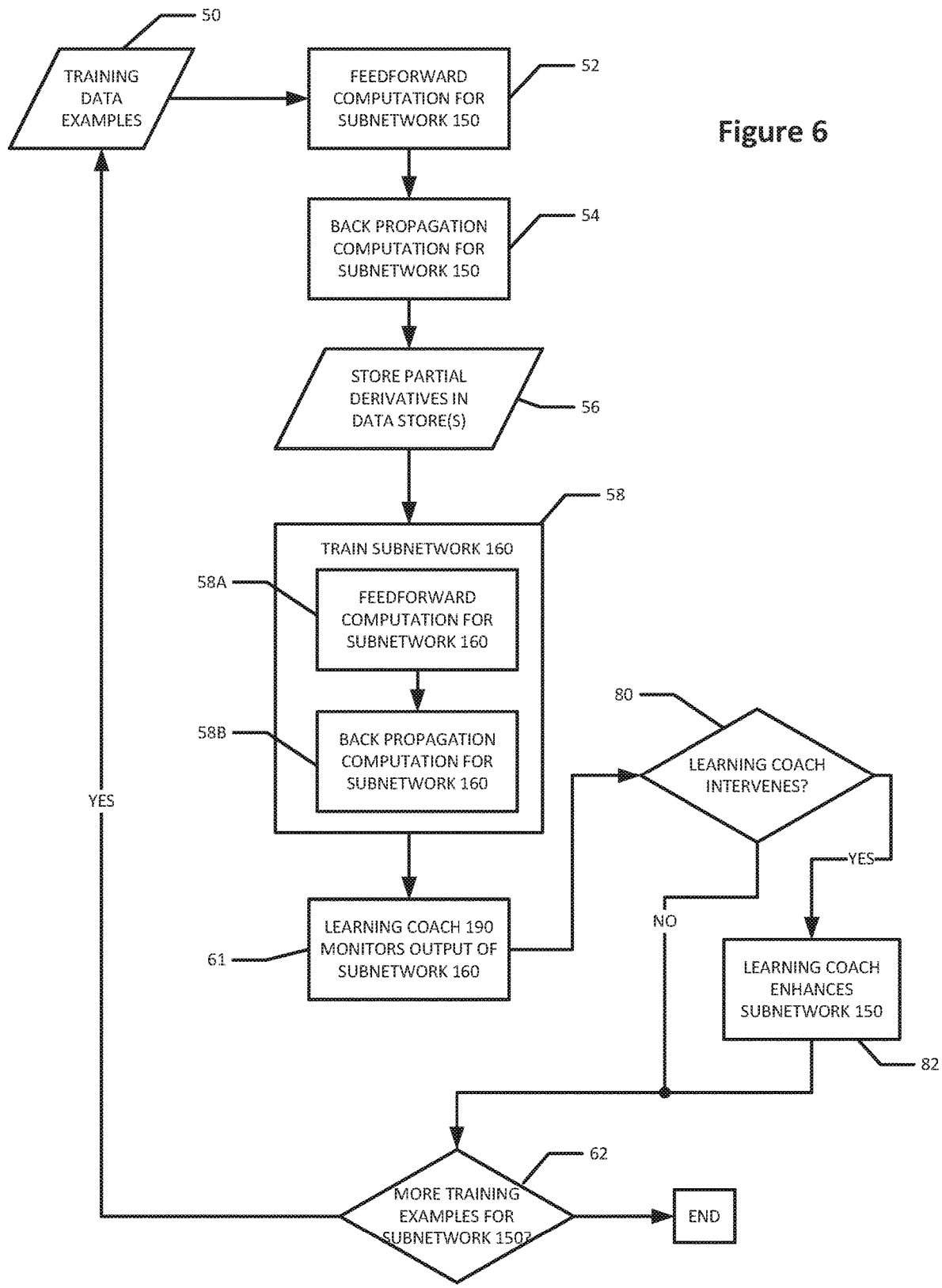

In other embodiments, the processes shown in FIGS. 5 and 6 can be combined; they are not necessarily mutually exclusive. For example, if there are connections from nodes in the subnetwork 150 that are connected to nodes in subnetwork 160, the new estimated partial derivatives back propagated from subnetwork 160 to subnetwork 150 may be computed and added to the partial derivatives estimated in the back propagation computation of subnetwork 150 to update the learned parameters for the subnetwork 150 at step 60 of FIG. 5. In addition, the learning coach 190 can monitor the outputs of the subnetwork 160 to determine whether, and how, to intervene to enhance the subnetwork 160, as shown in steps 80-82 of FIG. 6.

In various embodiments, there could be additional subnetworks 160, each for a separate target node in the subnetwork 150, with such other subnetworks 160 being trained and computing improvements for the subnetwork 150 in the same was as described herein. Also, in the description above, the subnetwork 160 received as inputs the partial derivatives about a single node 101 in the subnetwork 150. In other embodiments, the subnetwork 160 may also receive as inputs partial derivatives for other (or all of) the nodes in the subnetwork 150, such as nodes 102-106, for example.

Figure 2:
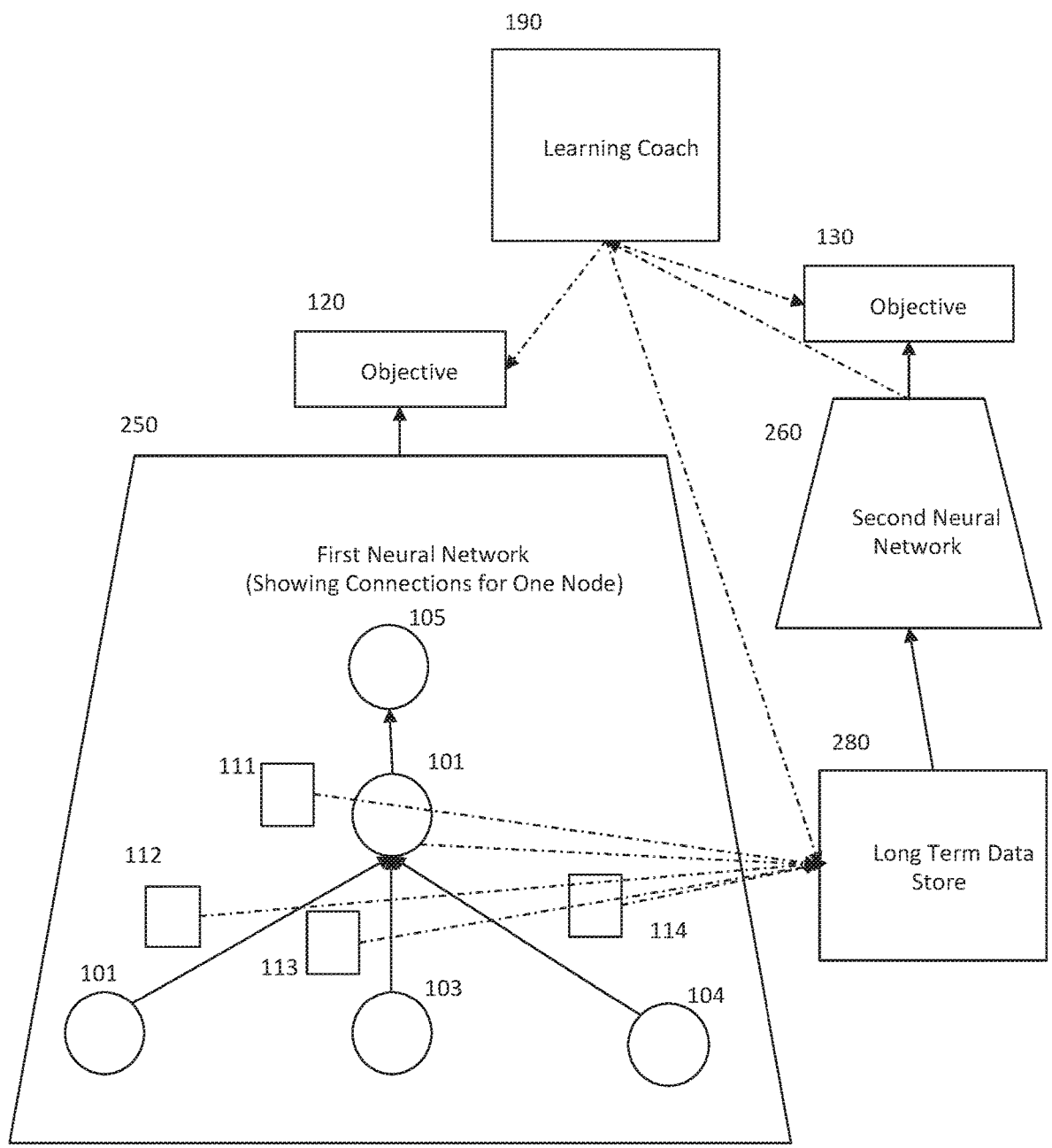
FIG. 2 is a block diagram of another illustrative embodiment of the present invention.

FIG. 2 shows another illustrative embodiment of the invention with some additional capabilities. The system and process illustrated by FIG. 2 is very similar to that of FIG. 1 with a few important differences. For example:

(a) Network 260 is similar to subnetwork 160 in FIG. 1, except that network 260 is a separate network from the first neural network 250 and does not receive input directly from the data stores 111, 112, 113, and 114 in the first network 250. Nor does the network 260 back propagate to the nodes in network 250. However, the second network 260 receives the same data and more via long term data store 280. That is, the long term data store can store data from data stores 111-114, and the data in the long term data store 280 can be used to train the network 260.

(b) Since network 260 is not directly connected to network 250, its training must still be delayed relative to the feed forward and back propagation computation by network 250. However, the training of network 260 is otherwise asynchronous. That is, the training of network 260 can be further delayed and the order of its computation for various data examples may be rearranged.

(c) Long term data store 280 in FIG. 2 can store all the same information that the network 160 received from network 150 in FIG. 1, e.g., the data stored in data stores 111-114. Furthermore, the long term data store 280 can store this information for an indefinite period of time. Note that, in various embodiments, the long term data store 280 receives information from the data stores 111-114, in addition to information directly from the target node 101 in the network 250. Thus, the long term data store 280 may receive the activation information for the target node 101 as well as the values of the estimated partial derivatives.

By themselves, differences (a) and (b) do not matter very much. However, the long term data store 280 can provide the network 260 with access to much more information than is available to network 160 of FIG. 1 at any one time. Thereby, the network 260 can perform many useful computations that network 160 is not able to perform. For example, the long term data store 280 can enable the network 260 to compare the performance on a data example with the performance on the same data example in a previous epoch of training. As another example, the long term data store 280 can enable the network 260 to compare the direction of gradient estimated for one minibatch with the direction of the gradient estimated for the previous minibatch. This information allows the network 260 to estimate, for example, whether the parameter values are approaching a stationary point in the objective function. Furthermore, this information accumulated over several minibatches may allow the network 260 to distinguish a saddle point from a local minimum. This information can facilitate decisions by learning coach 190 to control and improve the learning process.

Many more examples are feasible for this embodiment because the network 260 is preferably a general purpose deep neural network. Such neural networks have the proven ability to learn extremely complex classifications and regressions. In this embodiment, this powerful ability is turned to learning arbitrarily complex patterns that can be useful to the learning coach 190 for controlling the learning process of network 250.

Figure 4:
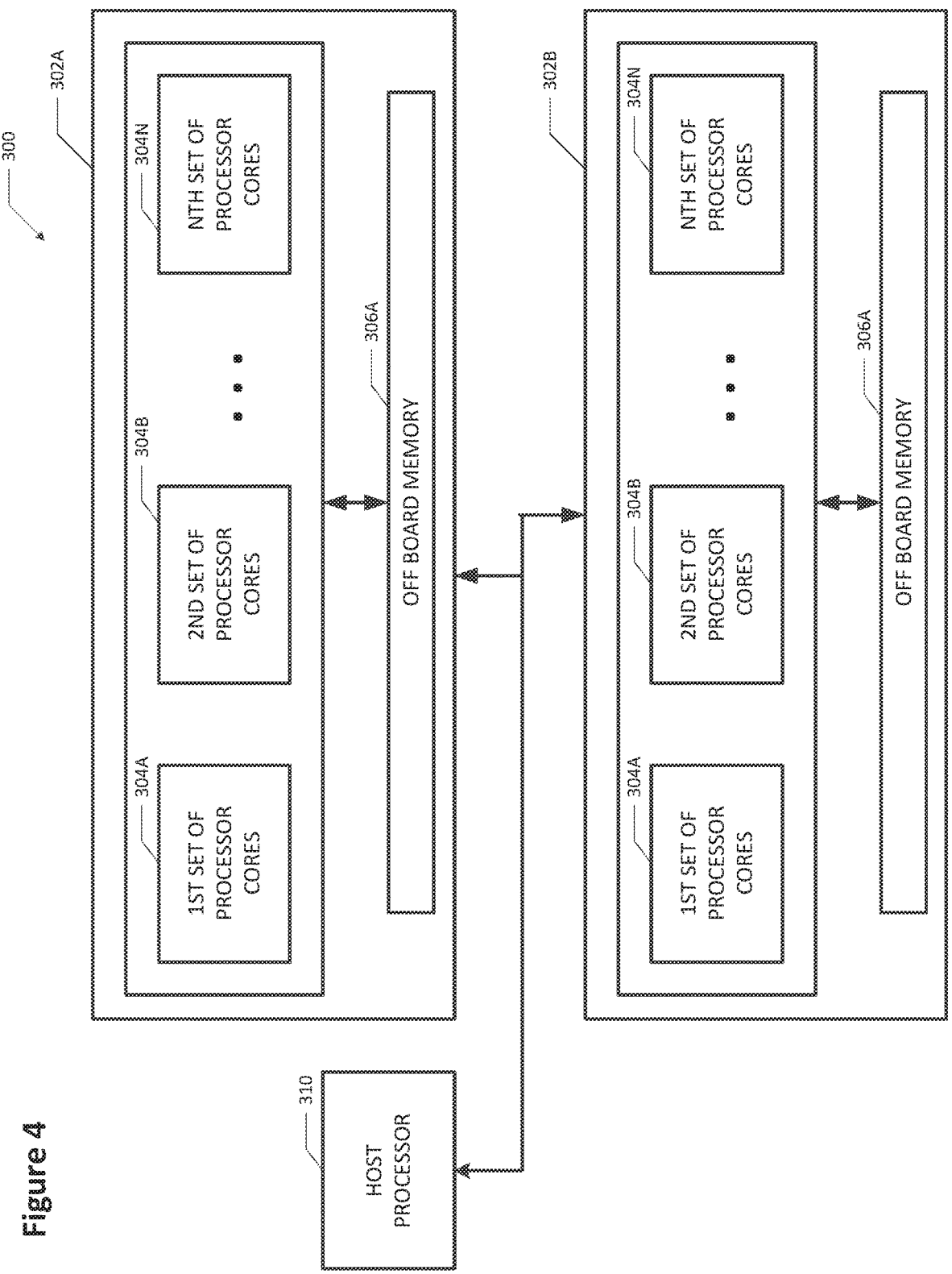
FIG. 4 is a diagram of a computer system according to various embodiments of the present invention.

FIG. 4 is a diagram of a computer system 300 that could be used to implement the embodiments described above. The illustrated computer system 300 comprises multiple processor units 302A-B that each comprises, in the illustrated embodiment, multiple (N) sets of processor cores 304A-N. Each processor unit 302A-B may comprise onboard memory (ROM or RAM) (not shown) and off-board memory 306A-B. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may train and/or implement different networks or subnetworks or components. For example, in one embodiment, the cores of the first processor unit 302A may implement the neural network 100/200 and the second processor unit 302B may implement the learning coach 190/290. Further, the first set of processor cores 304A in the first processor unit 302A may be responsible for the first subnetwork 150/250 (e.g., the two-phase training for training examples described above) and the second set of processor cores 304B in the first processor unit 302A may be responsible for the second subnetwork 160/260, and so on. The on-board and/or off-board memory may comprise the data stores 111-114, 280, for example. The data stores 111-114, 280 may comprise relational databases and/or distributed data stores, for example. One or more host processors 310 may coordinate and control the processor units 302A-B.

In other embodiments, the system 100 could be implemented with one processor unit 302. In embodiments where there are multiple processor units, the processor units could be co-located or distributed. For example, the processor units 302 may be interconnected by data networks, such as a LAN, WAN, the Internet, etc., using suitable wired and/or wireless data communication links. Data may be shared between the various processing units 302 using suitable data links, such as data buses (preferably high-speed data buses) or network links (e.g., Ethernet).

The software for the various compute systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to computer systems and computer-implemented methods for training a first deep neural network. In various embodiments, the method comprises the steps of: (a) training the first deep neural network 150/250 with a first training data example, where training the first deep neural network 150/250 with a first training data example comprises: (i) a feedforward computation through the first deep neural network 150/250; and (ii) a back-propagation computation, with respect to a first objective, through the first deep neural network at least to a target node 101 in a hidden layer of the first deep neural network 150/250; (b) training a second deep neural network 160/260 with a second objective that is different from the first objective, where training the second deep neural 160/260 network comprises using as input one or more values computed in the back-propagation computation for the first deep neural network 150/250 relative to the target node 101; and (c) improving the first deep neural network 150/250 based on a computation by the second deep neural network. Steps (a) and (b) above can be repeated for a plurality of training data examples, and step (c) may comprise improving the first deep neural network based on computations by the second deep neural network in step (b) for the plurality of training data examples. The computer system comprises one or more processors 304 (e.g., GPU(s)) programmed to perform the above-described steps.

In various implementations, the one or more values computed in the back-propagation computation for the first deep neural network used for training the second deep neural network can comprise one or more estimated partial derivatives of the first objective relative to the target node, such as an estimated partial derivative of the first objective with respect an output activation of the target node; an estimated partial derivative of the first objective with respect to an input value to the target node during the feedforward computation through the first deep neural network; an estimated partial derivative of the first objective with respect to a bias to the target node; and/or an estimated partial derivative of the first objective with respect to one or more connection weights to the target node. Further, the training of the second deep neural network can use any such computed estimated partial derivatives. Still further, any such estimated partial derivatives of the first objective that are computed relative to the target node can be stored in a data store 111-114 that is accessible by the second deep neural network.

In various implementations, the first deep neural network may comprise at least one connection from the second deep neural network, in which case improving the first deep neural network can comprise setting a customized hyperparameter for the first deep neural network with one or more estimated partial derivatives computed in the training of the second deep neural network. Also, the step of improving the first deep neural network may comprise: monitoring, with a machine-learning learning coach, an output of the second deep neural network; and determining, by the machine-learning learning coach, an enhancement to the first deep neural network based on the monitoring. The enhancement may be, for example, a revised hyperparameter for the first deep neural network, a structural change for the first deep neural network, and/or selective data training for the first deep neural network.

In still other implementations, the first and second deep neural networks are each a subnetwork of a main neural network. Also, the first deep neural network may be disjoint from the second deep neural network with no connections from the second deep neural network to the first deep neural network.

Based on the above description, it is clear that embodiments of the present invention can be used to improve many different types of machine learning systems, particularly neural networks. For example, embodiments of the present invention can improve recommender systems, speech recognition systems, and classification systems, including image and diagnostic classification systems, to name but a few examples.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of training a first deep neural network, the method comprising:

[a] training the first deep neural network with a first training data example, wherein training the first deep neural network with a first training data example comprises:
a feedforward computation through the first deep neural network; and
a back-propagation computation, with respect to a first network objective function for the first deep neural network, through the first deep neural network at least to a target node in a hidden layer of the first deep neural network, wherein the first network objective function is for measuring quality of output of the first deep neural network, wherein the backpropagation computation comprises, at least, an estimated partial derivative of the first network objective with respect to an output of the target node, an input to the target node, and/or a connection weight for a connection to the target node from another node in the first deep neural network;

[b] training a second deep neural network with a second network objective function that is different from the first network objective function, wherein the second network objective function is for measuring quality of output of the second deep neural network, wherein training the second deep neural network comprises inputting to an input layer of the second deep neural network at least the estimated partial derivative computed in the back-propagation computation for the first deep neural network relative to the target node, such that the second deep neural network is trained to compute an output based on estimated partial derivatives computed in the back-propagation computation for the first deep neural network relative to the target node; and

[c] improving the first deep neural network based on an output of the second deep neural network.

2. The method of claim 1, wherein:
the first deep neural network comprises at least one connection from the second deep neural network; and
improving the first deep neural network comprises setting a customized hyperparameter for the first deep neural network with one or more estimated partial derivatives computed in the training of the second deep neural network.

3. The method of claim 1, wherein improving the first deep neural network comprises:
monitoring, with a machine-learning learning coach, the output of the second deep neural network; and
determining, by the machine-learning learning coach, an enhancement to the first deep neural network based on the monitoring.

4. The method of claim 3, wherein the enhancement to the first deep neural network determined by the machine-learning learning coach comprises a revised hyperparameter for the first deep neural network.

5. The method of claim 3, wherein the enhancement to the first deep neural network determined by the machine-learning learning coach comprises a structural change for the first deep neural network.

6. The method of claim 3, wherein the enhancement to the first deep neural network determined by the machine-learning learning coach comprises selective data training for the first deep neural network.

7. The method of claim 1, wherein the first and second deep neural networks are each a subnetwork of a main neural network.

8. The method of claim 7, wherein there are no connections from the second deep neural network to the first deep neural network.

9. The method of claim 1, further comprising storing the estimated partial derivative of the first network objective function in a data store accessible by the second deep neural network.

10. The method of claim 1, further comprising repeating steps [a] and [b] for a plurality of training data examples, and step [c] comprises improving the first deep neural network based on computations by the second deep neural network in step [b] for the plurality of training data examples.

11. A computer system for training a first deep neural network, the computer system comprising one or more processors programmed to:
train the first deep neural network with a first training data example, wherein training the first deep neural network with a first training data example comprises:
a feedforward computation through the first deep neural network; and
a back-propagation computation, with respect to a first network objective function, through the first deep neural network at least to a target node in a hidden layer of the first deep neural network, wherein the first network objective function is for measuring quality of output of the first deep neural network, wherein the back-propagation computation comprises, at least, an estimated partial derivative of the first network objective with respect to an output of the target node, an input to the target node, and/or a connection weight for a connection to the target node from another node in the first deep neural network;
train a second deep neural network with a second network objective function that is different from the first network objective function, wherein the second network objective function is for measuring quality of output of the second deep neural network, and wherein training the second deep neural network comprises inputting to an input layer of the second deep neural network at least the estimated partial derivative computed in the back-propagation computation for the first deep neural network relative to the target node, such that the second deep neural network is trained to compute an output based on estimated partial derivatives computed in the back-propagation computation for the first deep neural network relative to the target node; and
improve the first deep neural network based on an output of the second deep neural network.

12. The computer system claim of 11, wherein:
the first deep neural network comprises at least one connection from the second deep neural network; and
the one or more processors are further programmed to improve the first deep neural network by updating one or more learned parameters for the first deep neural network with one or more estimated partial derivatives computed in the training of the second deep neural network.

13. The computer system claim of 11, the one or more processors are programmed to improve the first deep neural network by:
monitoring, with a machine-learning learning coach, the output of the second deep neural network; and
determining, by the machine-learning learning coach, an enhancement to the first deep neural network based on the monitoring.

14. The computer system of claim 13, wherein the enhancement to the first deep neural network determined by the machine-learning learning coach comprises a revised hyperparameter for the first deep neural network.

15. The computer system of claim 13, wherein the enhancement to the first deep neural network determined by the machine-learning learning coach comprises a structural change for the first deep neural network.

16. The computer system of claim 13, wherein the enhancement to the first deep neural network determined by the machine-learning learning coach comprises selective data training for the first deep neural network.

17. The computer system of claim 11, wherein the first and second subnetworks are each a subnetwork of a main neural network.

18. The computer system of claim 17, wherein there are no connections from the second deep neural network to the first deep neural network.

19. The computer system of claim 11, further comprising a data store accessible by the second deep neural networks for storing the estimated partial derivative of the first network objective function with respect the output activation of the target node.

20. The computer system of claim 11, wherein the one or more processors comprise a GPU.

* * * * *